United States Patent
Winokur (10) Patent No.: US 12,314,576 B2
(45) Date of Patent: May 27, 2025

(54) STORAGE FOR AI APPLICATIONS

(71) Applicant: Alex Winokur, Ramat Gan (IL)

(72) Inventor: Alex Winokur, Ramat Gan (IL)

( * ) Notice: Subject to any disclaimer, the term of this patent is extended or adjusted under 35 U.S.C. 154(b) by 23 days.

(21) Appl. No.: 18/548,936

(22) PCT Filed: May 11, 2022

(86) PCT No.: PCT/IB2022/054368
§ 371 (c)(1),
(2) Date: Sep. 5, 2023

(87) PCT Pub. No.: WO2022/238914
PCT Pub. Date: Nov. 17, 2022

(65) Prior Publication Data
US 2024/0152285 A1   May 9, 2024

Related U.S. Application Data

(60) Provisional application No. 63/186,823, filed on May 11, 2021.

(51) Int. Cl.
*G06F 12/00*  (2006.01)
*G06F 3/06*  (2006.01)

(52) U.S. Cl.
CPC .......... *G06F 3/0622* (2013.01); *G06F 3/0659* (2013.01); *G06F 3/0673* (2013.01)

(58) Field of Classification Search
None
See application file for complete search history.

(56) References Cited

U.S. PATENT DOCUMENTS

| | | | |
|---|---|---|---|
| 9,678,680 B1* | 6/2017 | Natanzon | G06F 11/2089 |
| 12,181,981 B1* | 12/2024 | Heidemeyer | G06F 16/275 |
| 2012/0017079 A1 | 1/2012 | Mraz et al. | |
| 2013/0007305 A1* | 1/2013 | Vikram | H04L 41/12 |
| | | | 710/16 |

(Continued)

OTHER PUBLICATIONS

International Application # PCT/IB2022/054368 Search Report dated Aug. 29, 2022.

(Continued)

*Primary Examiner* — Daniel D Tsui
(74) *Attorney, Agent, or Firm* — Meitar Patents Ltd.; Daniel Kligler (57) ABSTRACT

A protected facility (20), including a processor (150) a network (46) and a security module (50) unidirectionally coupling the network to a workstation (34) external to the facility, and configured to carry commands (78) unidirectionally from the workstation to the network and to be incapable of carrying commands in the opposite direction. A storage controller (24) coupled the network is configured to define first and second volumes (64) including respective sets of storage blocks (136), to store data (30) to the first volume, and to expose the second volume workstation (34). The processor is coupled to the network and configured to receive commands only from the workstation via the module, to receive, from the storage controller, access to the data, to receive, from the workstation, a command to train a model (32), to analyze the data to train the model, and to store the trained model to the second volume.

20 Claims, 6 Drawing Sheets

(56) References Cited

U.S. PATENT DOCUMENTS

2018/0173572 A1  6/2018  Bequet et al.
2020/0082272 A1  3/2020  Gu et al.

OTHER PUBLICATIONS

Wikipedia, "Internet protocol suite," pp. 1-12, last edited May 2, 2021.
Wikipedia, "SCSI," pp. 1-10, last edited May 4, 2021.
Amazon Web Services, Inc., "What's the Difference Between NFS and CIFS?," pp. 1-8, year 2023, as downloaded from https://aws.amazon.com/compare/the-difference-between-nfs-and-cifs/.
Wikipedia, "Graphical user interface," pp. 1-11, last edited Apr. 13, 2021.
Amazon Web Services, Inc., "What is a CLI? (Command Line Interface)," pp. 1-10, year 2023, as downloaded from https://aws.amazon.com/what-is/cli/.

* cited by examiner

STORAGE FOR AI APPLICATIONS

CROSS-REFERENCE TO RELATED APPLICATIONS

This application claims the benefit of U.S. Provisional Patent Application 63/186,823, filed May 11, 2021, which is incorporated herein by reference.

FIELD OF THE INVENTION

The present invention relates generally to data storage, and particularly to a system for protecting deep learning inference engine training data from any data breaches.

BACKGROUND OF THE INVENTION

Deep learning can be defined as the process of inferencing knowledge based on a deep learning inference model (also known as an artificial neural network model). The creation of the neural network model is performed by analyzing deep learning inference engine training data so as to train the model. Subsequent to the training, the model can then be used to make intelligent predictions from additional (i.e., new and novel) model data.

Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The description above is presented as a general overview of related art in this field and should not be construed as an admission that any of the information it contains constitutes prior art against the present patent application.

SUMMARY OF THE INVENTION

There is provided, in an embodiment of the present invention, an apparatus including an internal network within a protected facility, and a security module within the protected facility unidirectionally coupling the internal network to a workstation external to the protected facility, and configured to carry commands in one direction from the workstation to the internal network and to be incapable of carrying commands in the opposite direction from the internal network to the workstation. The apparatus also includes a storage controller coupled to a storage network and the internal network, and configured to define first and second volumes including respective sets of storage blocks on one or more storage devices, to store a dataset to the first volume, and to expose the second volume to the workstation via the storage network. The apparatus further includes a processor within the protected facility, coupled to the internal network and configured to receive the commands only from the security module in response to the commands conveyed by the workstation via the security module, and is further configured to receive, from the storage controller, access to the dataset, to receive, from the workstation via the security module, a given command including a request to train a deep learning inference model, to analyze, in response to the request, the dataset so as to train the deep learning inference model, and to store, via the storage network, the trained deep learning inference model to the second volume.

In one embodiment, the processor is further configured to prevent exposing the dataset to any computing device external to the protected facility, wherein a given computing device includes the workstation.

In some embodiments, the processor is configured to receive access to the dataset in response to generating, by the storage processor, a snapshot volume including a copy of the dataset, and exposing, by the storage processor, the snapshot volume solely to the processor, and wherein the processor is configured to analyze the dataset by analyzing the copy of the dataset on the snapshot volume.

In another embodiment, the storage controller is configured to expose the second volume to the workstation by setting permissions of the second volume to the workstation as read-only.

In an additional embodiment, the security module is configured to carry commands in one direction by forwarding only the commands found in a dynamically updated set of commands.

In a further embodiment, a given command includes an identity of a software application.

In one embodiment, the software application includes a model training application, and wherein the processor is configured to train the deep learning inference model by executing a model training application.

In another embodiment, the model training application is configured to execute in batch mode.

In some embodiments, the processor is configured to analyze the dataset by executing a batch application.

In an additional embodiment, a given command includes an application programming interface (API) call.

In a further embodiment, wherein a given command includes a command line interface (CLI) command.

In some embodiments, the processor is further configured to generate interim results while training the deep learning inference model, and to store the interim results to the second volume.

In a supplemental embodiment, the security module is further configured to carry responses in the opposite direction from the internal network to the workstation In one embodiment, the deep learning inference model includes a classifier.

In an additional embodiment, wherein the protected facility is further configured to enclose the storage controller.

In a further embodiment, the processor includes one or more graphics processing units (GPUs).

In a supplemental embodiment, the storage network includes a storage area network (SAN).

In another embodiment, the storage network includes network attaches storage (NAS).

In some embodiments, the request to train a deep learning inference model includes a request to perform data analysis, wherein the processor can train the deep learning inference model by analyzing the data so as to generate results and wherein the processor can store the trained deep learning inference model by storing the results of the analysis.

There is also provided, in an embodiment of the present invention, a method, including providing an internal network within a protected facility, and providing a security module within the protected facility unidirectionally coupling the internal network to a workstation external to the protected facility, and configured to carry commands in one direction from the workstation to the internal network and to be incapable of carrying commands in the opposite direction from the internal network to the workstation. The method also includes providing a storage controller coupled to a storage network and the internal network, and configured to define first and second volumes including respective sets of storage blocks on one or more storage devices, to store a dataset to the first volume, and to expose the second volume to the workstation via the storage network. The method additionally includes providing a processor within the protected facility, coupled to the internal network and configured to receive the commands only from the security module in response to the commands conveyed by the workstation via the security module, and is further configured to receive, from the storage controller, access to the dataset, to receive, from the workstation via the security module, a given command including a request to train a deep learning inference model, to analyze, in response to the request, the dataset so as to train the deep learning inference model, and to store, via the storage network, the analysis results to the second volume.

BRIEF DESCRIPTION OF THE DRAWINGS

The disclosure is herein described, by way of example only, with reference to the accompanying drawings, wherein.

DETAILED DESCRIPTION OF EMBODIMENTS

Overview

When training a deep learning inference model, a large amount of deep learning inference engine training data is analyzed so as to identify patterns which can later be used to assert intelligent conclusions about new data points. Since the data being analyzed may comprise sensitive information (e.g., identification numbers, health information, financial information), performing analytic operations on the data may be subject to data privacy regulations.

Data privacy regulations and concerns may pose significant challenges to deep learning inference model training. On the one hand, the training process mandates access to almost all data without discrimination, but on the other hand, care must be taken to ensure that no privacy regulations are violated.

When executing a third-party model training application to train a deep learning inference model, the application may expose the training data to vulnerabilities such as:

Any "back doors" or trojan horses in the software that allow unauthorized access to the data.

Any unintentional loopholes in the software through which a hacker can gain access to the data.

Corruption of the data by the application.

One way to prevent these threats is to have the third-party model training applications undergo a tedious process of data safety certification, and to train users to monitor and control access to data by these applications. However, these requirements may be difficult to implement, thereby inhibiting the use of (otherwise) very effective training applications.

Embodiments of the present invention provide systems that protect and guarantee data privacy protection when executing any classification training application, even if the application comprises any malicious executable code. As described hereinbelow, the system comprises an internal network within a protected facility, and a security module within the protected facility unidirectionally coupling the internal network to a workstation external to the protected facility. The security module can be configured to carry a set of predefined commands in one direction from the workstation to the internal network and to be incapable of carrying commands in the opposite direction from the internal network to the workstation.

The system also comprises a storage controller coupled to a storage network and the internal network. In some embodiments, the storage controller can be configured to define first and second volumes comprising respective sets of storage blocks on one or more storage devices, to store a dataset to the first volume, and to expose the second volume to the workstation via the storage network.

The system additionally comprises an artificial intelligence (AI) controller within the protected facility and coupled to the internal network. The AI controller may comprise a processor configured to receive the commands only from the security module in response to the commands conveyed by the workstation via the security module. The processor is further configured to receive, from the storage controller, access to the dataset, to receive, from the workstation via the security module, a given command comprising a request to load and train a deep learning inference model, to analyze, in response to the request, the dataset so as to train a deep learning inference model, and to store, via the storage network, the trained deep learning inference model to the second volume.

To train the deep learning inference model, the processor can execute a model training application. As described supra, the processor is within the protected facility and coupled to the internal network. Since the security module may allow only a predefined set of commands to pass through and also prevents carrying commands in the opposite direction from the internal network to the workstation (or any computing device outside the protected facility), systems implementing embodiments of the present invention can prevent any malicious code in the model training application from communicating with a malicious server outside the protected facility that can initiate a cybersecurity attack such as an exfiltration attack where an adversary is trying to steal data.

System Description

Figure 1:
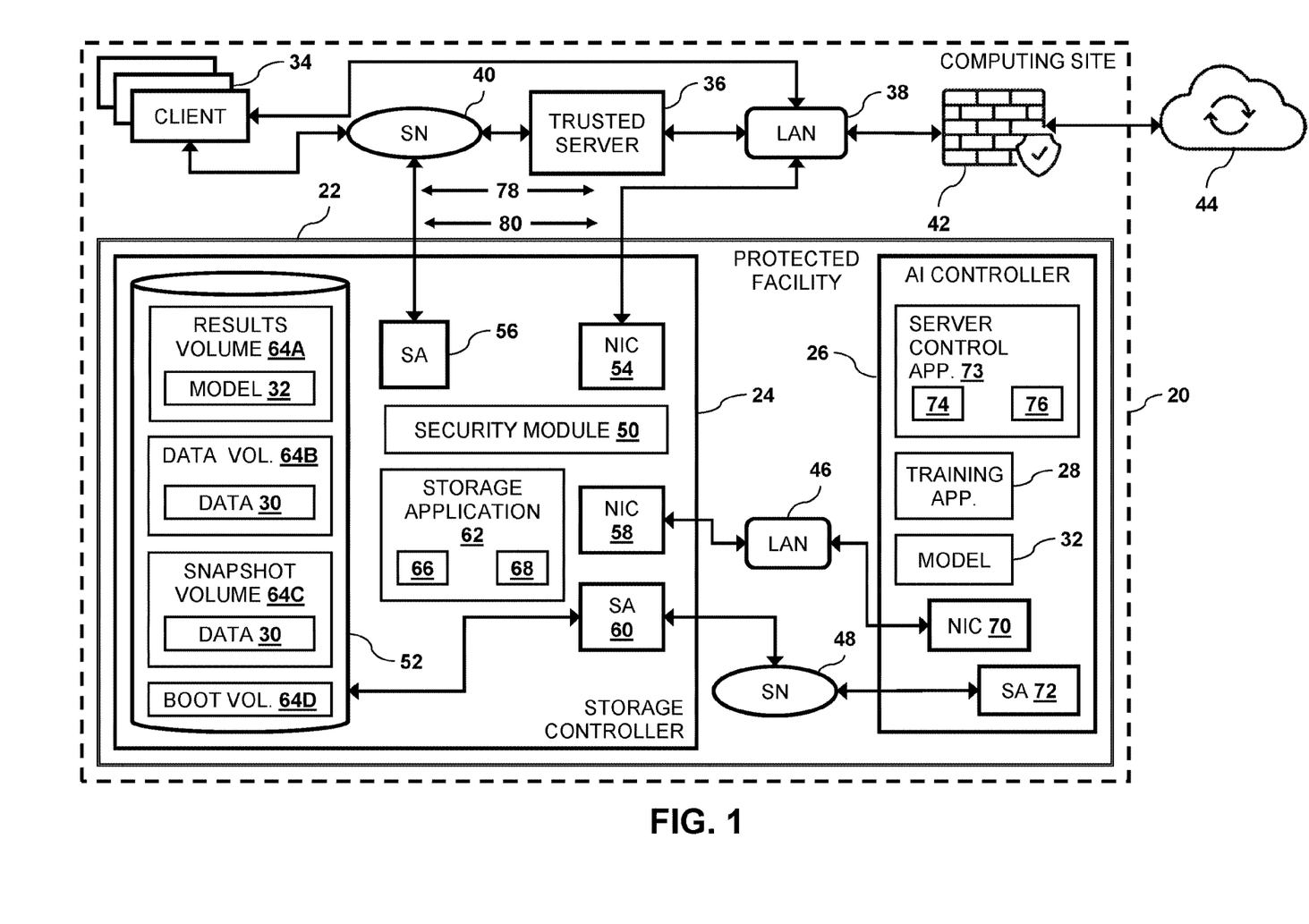
FIG. 1 is a block diagram that schematically shows a computing site comprising a protected facility comprising a storage controller and an artificial intelligence (AI) controller that are configured to protect deep learning inference engine training data from any data breaches, in accordance with a first configuration embodiment of the present invention.

FIG. 1 is a block diagram that schematically shows a computing site 20 comprising a protected facility 22 that encloses a storage controller 24 and an artificial intelligence (AI) controller 26, in accordance with a first configuration embodiment of the present invention. As described hereinbelow, AI controller 26 can be configured to execute a model training application 28 that analyzes deep learning inference engine training data 30 so as to train a deep learning inference model 32 (also known as an artificial neural network model). In some embodiments, deep learning inference engine training data 30 may also be referred to as dataset 30 or training data 30.

In embodiments herein deep learning inference model 32 may comprise any type of machine learning classification model (i.e., a classifier) comprising a classification algorithm, that maps input data to a category so as to assign a class label to subsequent input data (i.e., production data).

In embodiments herein, the term "protected facility" may refer to a physical enclosure that blocks access to user input/output devices (e.g., keyboards, displays) and physical ports (e.g., USB ports, serial ports and network ports such as Ethernet™ ports) on controllers 24 and 26, thereby preventing any unsupervised/unauthorized access to the controllers.

In the configuration shown in FIG. 1, computing site 20 also comprises one or more client workstations 34 (also referred to herein simply as workstations 34) and a trusted server 36 that are coupled to an external local area network (LAN) 38 and an external storage network (SN) 40. Workstations 34 are external to protected facility 22. An example configuration of a given client workstation 34 is described in the description referencing FIG. 3 hereinbelow, and an example configuration of trusted server 36 is described in the description referencing FIG. 4 hereinbelow.

Computing site 20 additionally comprises a firewall 42 that protects AI controller 26, workstation(s) 34 and trusted server 36 when they communication with computing devices (not shown) such as public servers via a public data network 44 such as the Internet.

In addition to storage controller 24 and AI controller 26, protected facility 22 may comprise (i.e., within the protected facility) an internal LAN 46, an internal SN 48, a security module 50 and one or more storage devices 52. In the configuration shown in FIG. 1, LAN 46 couples storage controller 24 to AI controller 26, and SN 48 couples storage controller 24 to AI controller 26 and storage device(s) 52. The functionality of security module 50 is described hereinbelow.

In some embodiments, storage controller 24 comprises one or more storage devices 52, a network interface controller (NIC) 54, and a storage adapter (SA) 56 that couples the storage controller to security module 50, a NIC 58 that couples the storage controller to LAN 46, and an SA 60 that couples the storage controller to SN 48. Storage controller 24 can be configured to execute a storage application 62 that manages volumes 64 stored on storage device(s) 52. In some embodiments, storage application 62 comprises a command line interface (CLI) 66 and/or an application programming interface (API) 68. Additional components of storage controller 24 are described in the description referencing FIG. 5 hereinbelow.

In embodiments described herein, volumes 64 can be differentiated by appending a letter to the identifying numeral, so that the volumes comprise a results volume 64A that stores (trained) deep learning inference model 32, a data volume 64B that stores data 30, a snapshot volume 64C that stores a copy of data 30, and a boot volume 64D. Boot volume 64D is described in the descriptions referencing FIGS. 4 and 6 hereinbelow.

In addition to model training application 28 and deep learning inference model 32, AI controller 26 may also comprise a NIC 70 that couples the AI controller to LAN 46, an SA 72 that couples the AI controller to SN 48, and a server control application 73 (i.e., a software application) that is configured to process commands 78 received from client(s) 34 (i.e., received from storage controller 24 via LAN 38, and forwarded by the controller via LAN 46), and to manage execution of model training application 28. In some embodiments, server control application 73 comprises a CLI 74 and/or an API 76. Additional components of AI controller 26 are described in the description referencing FIG. 6 hereinbelow.

In the configuration shown in FIG. 1, SNs 40, 48 and LANs 38, 46 convey commands 78 and responses 80 transmitted between client workstations 34 trusted server 36, storage controller 24 and AI controller 26. Commands 78 may comprise CLI commands to CLIs 66 and 74, and/or API calls to APIs 68 and 76. Upon processing commands 78, storage application 62 and model training application 28 may convey responses 80 (i.e., in response to the requests).

LANs 38 and 46 typically comprise data networks that enable workstation(s) 34, trusted server 36, storage controller 24 and AI controller 26 to communicate using protocols such as Transmission Control Protocol/Internet Protocol (TCP/IP).

In the configuration shown in FIG. 1, security module 50 is within protected facility 22, and enables communication in one direction between a given workstation 34 and controllers 24 and 26. In some embodiments, security module 50 can be configured to enable unidirectional communication by restricting the unidirectional communication to only allow a predefined set of commands 78 to be conveyed (i.e., carried) in one direction from the workstations to the internal networks (i.e., controllers 24 and 26) and to be incapable of conveying any commands 78 or initiating communication in the opposite direction from the internal networks to the workstation. In other words, security module 50 intercepts commands 78 and responses 80 conveyed in a first direction by SN 40 and/or LAN 38 to storage controller 24, and intercepts the commands and the responses conveyed in a second direction by the storage controller to SN 40 and/or LAN 38. In embodiments described herein, security module 50 can be configured to forward responses 80 in both the first and the second directions, but only forwards commands 78 in the first direction (i.e., the security module blocks any commands 78 conveyed in the second direction).

In additional embodiments, security module 50 can be configured to enable unidirectional communication between a given workstation 34 and controllers 24 and 26 by filtering commands 78 so as to only forward (i.e., in the first direction) a specific set of the commands from LAN 38 and/or SN 40 to controllers 24 and 26.

In further embodiments, security module 50 can be configured to enable unidirectional communication between a given workstation 34 and AI controller and 26 by preventing AI controller 26 from initiating any communication (e.g., by conveying an API call to open a TCP socket, or by sending unsolicited UDP frames) with any computing device internal (e.g., any workstation 34 or trusted server 36) or external (e.g., Internet-based servers) to computing site 20.

Upon security module 50 receiving commands 78 from SN 40 and/or LAN 38, the security module forwards the received commands to storage controller 24 via SA 56 or NIC 54. The commands received by storage controller 24 may be for either storage application 62 or for AI controller 26. Upon receiving a given command 78 for model training application 28, security module 50 can forward the given command to AI controller 26 via LAN 46 (i.e., using NICs 58 and 70) or via SN 48 (i.e., using SAs 60 and 72).

Similarly, storage controller 24 can convey responses 80 from storage application 62 to security module 50 (which forwards to the responses to SN 40 and/or LAN 38) via SA 56 and/or NIC 54. Storage controller can also forward, to security module 50, responses 80 received (i.e., via SN 48 or LAN 46) from training application 28.

Figure 2:
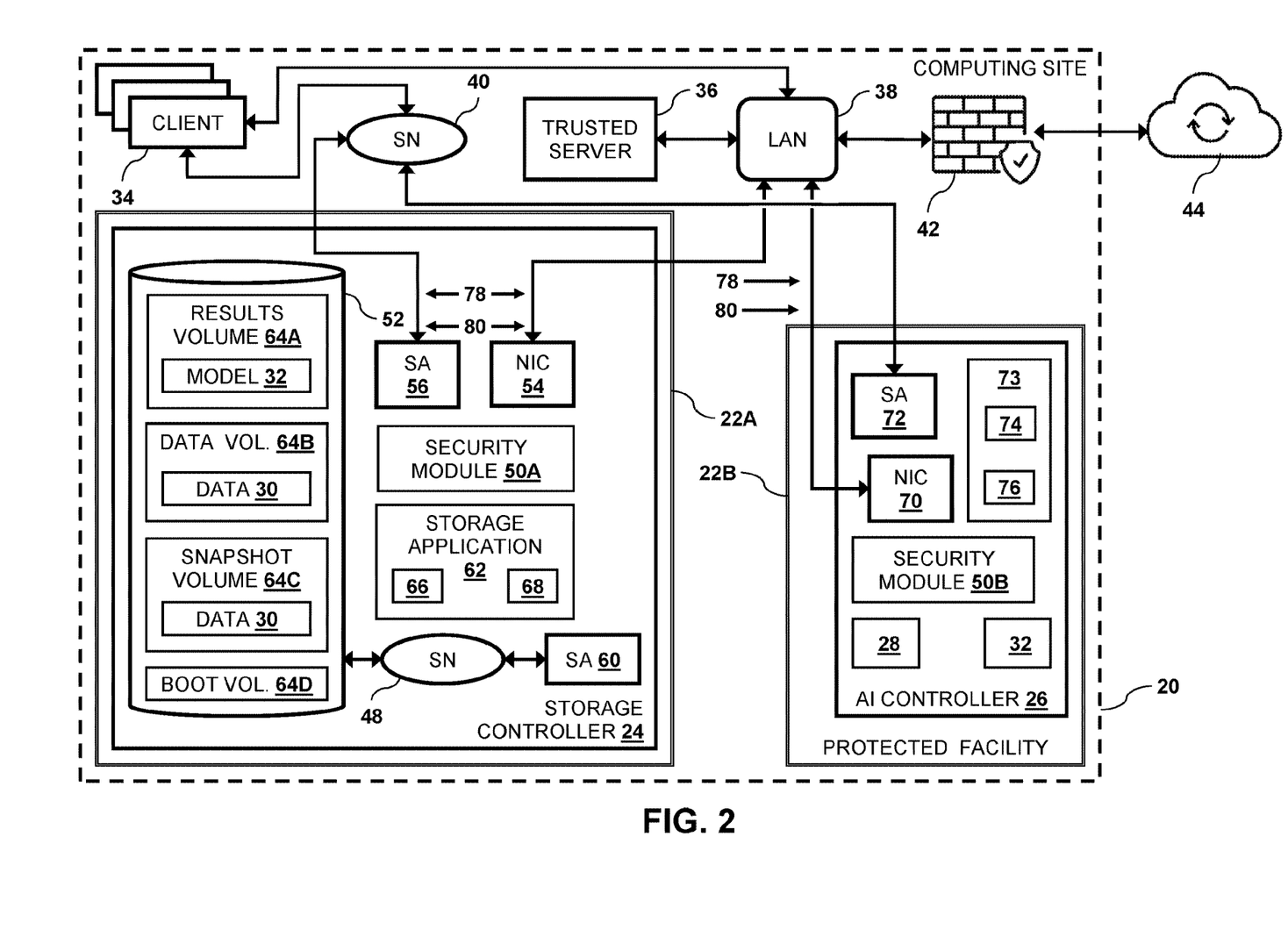
FIG. 2 is a block diagram that schematically shows the computing site comprising the storage controller and the protected facility comprising the artificial intelligence (AI) controller, in accordance with a second configuration embodiment of the present invention.

FIG. 2 is a block diagram that schematically shows a computing site 20 comprising a protected facility 22, in accordance with a second configuration embodiment of the present invention. In FIG. 2, protected facilities 22 and security modules 50 can be differentiated by appending a letter to the identifying numeral, so that the protected facilities comprise protected facilities 22A and 22B, and the security modules comprise security modules 50A and 50B.

In the second configuration embodiment:
Protected facility 22A encloses storage controller 24, and protected facility 22B encloses AI controller 26.
Storage controller 24 does not comprise NIC 58, and computing site 20 does not comprise LAN 46.
Storage controller 24 comprises security module 50A that restricts communication between the storage controller and networks 38 and 40 using embodiments described herein.
AI controller 26 comprises security module 50B that restricts communication between the AI controller and networks 38 using embodiments described herein. In the first configuration embodiment shown in FIG. 1, security module routes communication between AI controller 26 and networks 38 and 40. In the second configuration embodiment shown in FIG. 2, security module 50B restricts communication between the AI controller and networks 38 via NIC 70.

Therefore, in the second configuration embodiment:
Security module 50A can:
  Forward commands 78 (or a specific set of commands 78, as describes supra) received from LAN 38 and/or SN 40 to storage application 62 via NIC 54 and/or SA 56.
  Block (i.e., does not forward to SN 40 and/or LAN 38) any commands 78 received from any software application executing on storage controller 24.
  Forwards responses 80 received from storage application 62 to LAN 38 and/or SN 40.
  Blocks (i.e., does not forward to storage application 62) any responses received from LAN 38 and/or SN 40.
Security module 50B can:
  Forward commands 78 (or a specific set of commands 78, as describes supra) received from LAN 38 to model training application 28 via NIC 70.
  Block (i.e., does not forward to LAN 38) any commands 78 received from any software application executing on AI controller 26.
  Forward responses 80 received from model training application 28 to LAN 38.
  Block (i.e., does not forward to AI controller 26) any responses received from LAN 38.

Figure 3:
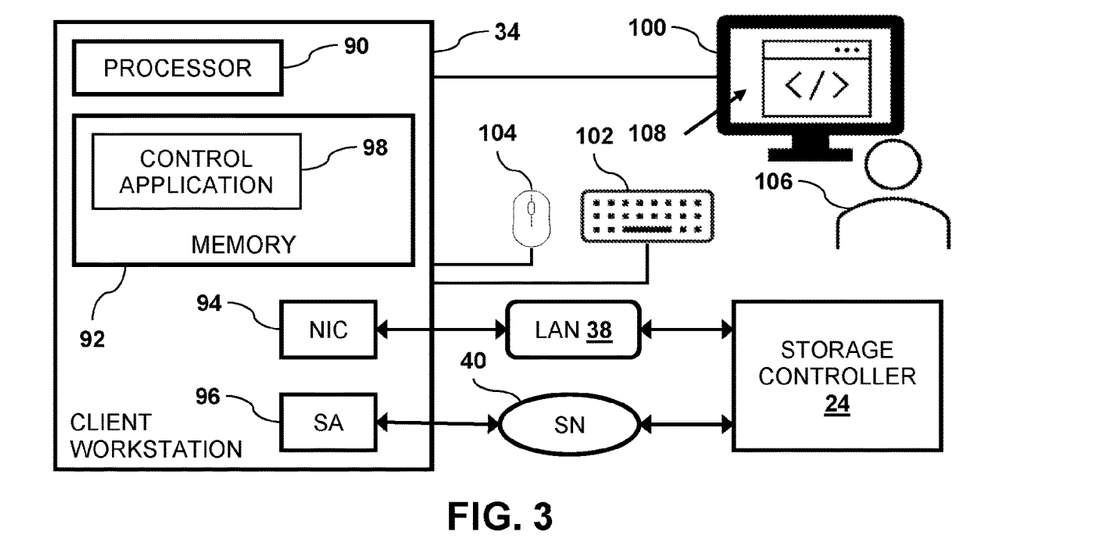
FIG. 3 is a block diagram that schematically shows hardware and software components of a client workstation within the computing site that is configured to communicate with the protected facility, in accordance with an embodiment of the present invention.

FIG. 3 is a block diagram that schematically shows hardware and software components of a given client workstation 34, in accordance with an embodiment of the present invention. In the configuration shown in FIG. 3, the given client workstation comprises a workstation processor 90, a workstation memory 92, a NIC 94 that couples the given workstation to LAN 38, and an SA 96 that couples the given workstation to SN 40.

In some embodiments, memory 92 may comprise a workstation control application 98, and processor 90 can execute the workstation control application so as to interact with AI controller 26. The given workstation may also comprise a display 100 and one or more input devices such as a keyboard 102 and a mouse 104. When executing workstation control application 98, processor 90 can present, to a user 106, a status screen (i.e., for the workstation control application) 108, and receive input from the user via the input device(s).

Figure 4:
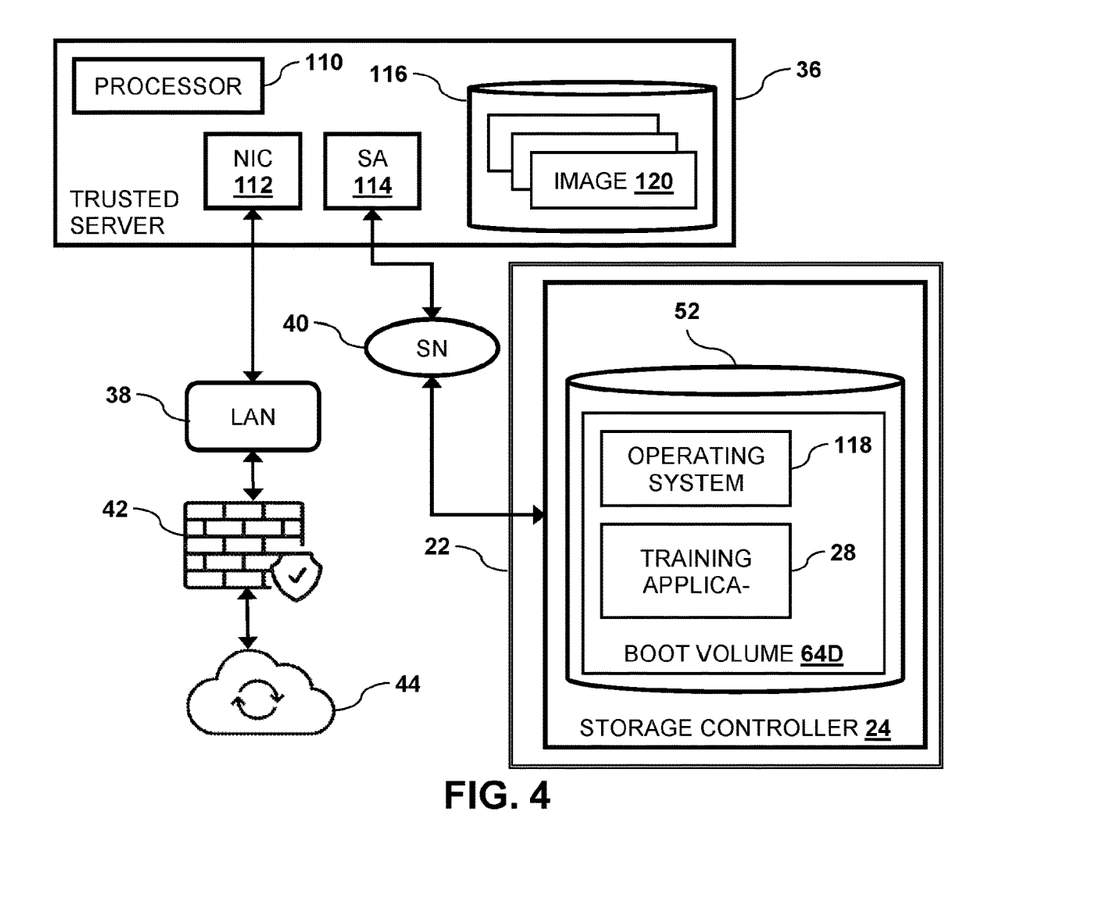
FIG. 4 is a block diagram that schematically shows hardware and data components of a trusted server within the computing site that is configured to communicate with the protected facility, in accordance with an embodiment of the present invention.

FIG. 4 is a block diagram that schematically shows hardware and data components of trusted server 36 and boot volume 64D, in accordance with an embodiment of the present invention. In the configuration shown in FIG. 4, trusted server 36 comprises a server processor 110, a NIC 112 that couples the trusted server to LAN 38, an SA 114 that couples the given workstation to SN 40, and a storage device 116.

Boot volume 64D comprises an operating system 118 (e.g., Linux™) and model training application 28. In some embodiments, storage device 116 stores multiple images 120 that comprise different versions of operating system 118 and model training application 28. As described hereinbelow, trusted server 36 can use a given image 120 to update operating system 118 and model training application 28 on boot volume 64D.

Figure 5:
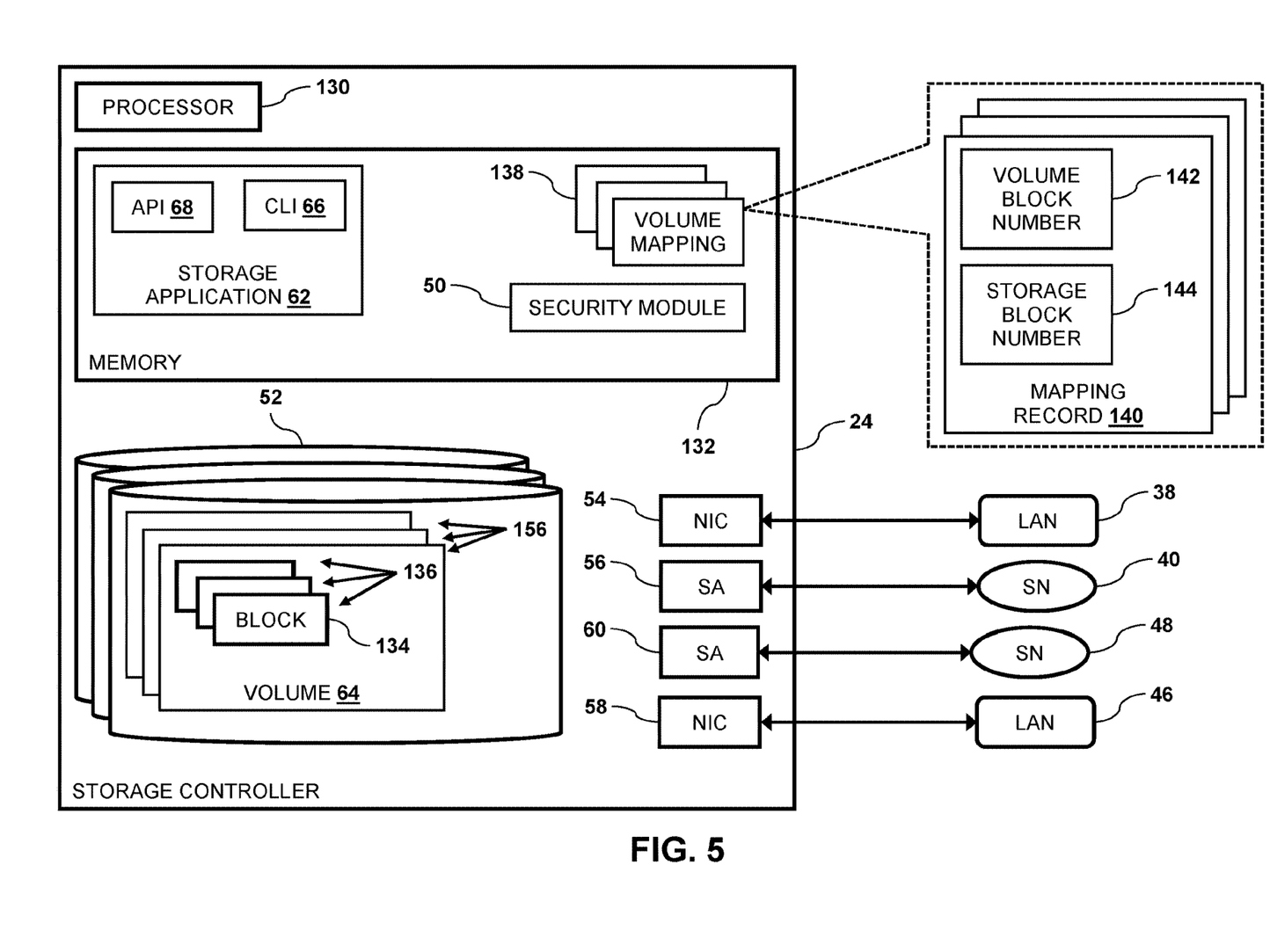
FIG. 5 is a block diagram that schematically shows hardware and software components of the storage controller, in accordance with an embodiment of the present invention.

FIG. 5 is a block diagram that schematically shows hardware and software components of storage controller 24 and volumes 64, in accordance with an embodiment of the present invention. In the configuration shown in FIG. 5, storage controller 24 also comprises a storage processor 130 and a storage memory 132, and volumes 64 comprise respective sets of storage blocks 134 on storage devices 52, wherein the storage blocks have respective storage block identifiers 136.

Memory 132 may comprise storage application 62, security module 50, and a set of volume mappings 138 that comprise respective sets of mapping records 140, wherein each of the mapping records comprise a volume block number 142 and a storage block number 144 that references a given storage block identifier 136. In some embodiments, storage application 62 can use volume mappings 138 to manage volumes 64. In embodiments herein, processor 130 executes, from memory 132, security module 50 and storage application 62. Storage application 62 can be configured to perform operation including, but not limited to:
  Managing blocks 134 in response to commands 78 received from workstations 34 and AI controller 26.
  Setting access permissions 156 (e.g., read/write or read/only) for volumes 64.
  Generating snapshots of volumes (e.g., snapshot volume 64C).

The configuration of storage controller 24 presented in FIG. 5 is configured to operate with the first configuration embodiment of protected facility 22 described in the description referencing FIG. 1 hereinabove. In an alternative configuration, storage controller 24 does not comprise NIC 54 and SA 56, and memory 132 comprises security module 50A. This alternative configuration of storage controller 24 can work with the second configuration embodiment of protected facility 22 described in the description referencing FIG. 2 hereinabove.

While embodiments herein describe security module 50 as a software application executing on processor 130 (and AI controller 26 in the second configuration embodiments), alternative implementations of the security module are considered to be within the spirit and scope of the present invention. For example, the functionality of security module 50 can be embedded in a device such as a router (not shown) on networks 38 and/or 46.

Figure 6:
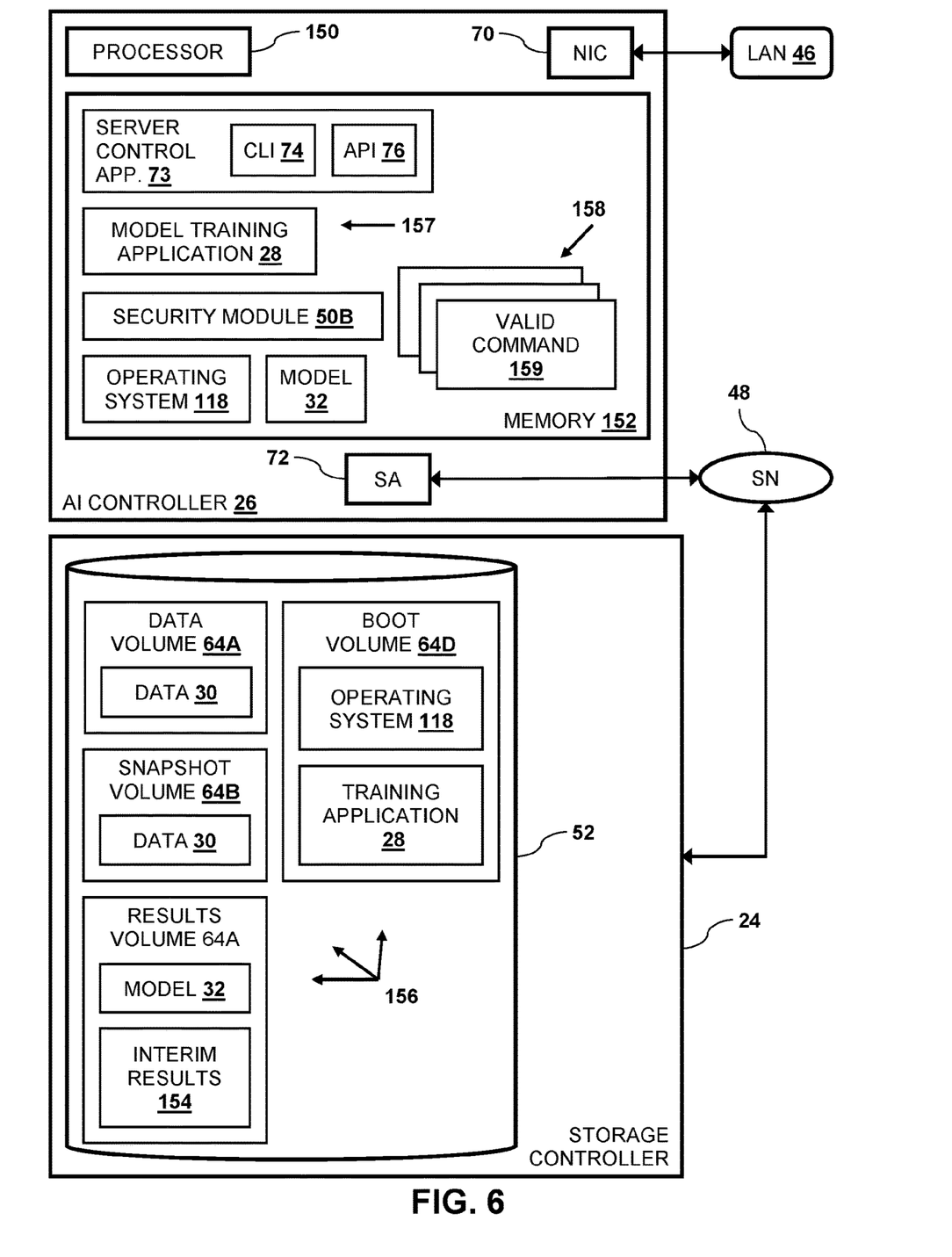
FIG. 6 is a block diagram that schematically shows hardware and software components of the AI controller, in accordance with an embodiment of the present invention.

FIG. 6 is a block diagram that schematically shows hardware and software components of AI controller 26 and results volume 64A, in accordance with an embodiment of the present invention. In the configuration shown in FIG. 6, AI controller 26 comprises an AI processor 150 and an AI memory 152 that stores model training application 28, deep learning inference model 32, server control application 73 and operating system 118.

In some embodiments model training application 28 executes on processor 150 in batch mode by reading, from snapshot volume 64B, one or more files (not shown) storing training data 30, analyzing the training data, and writing, to results volume 64A, one or more files (not shown) storing model 32. By executing in batch mode, model training application 28 can perform these steps without any (or with minimal) intervention from user 106. In embodiments described herein, input (i.e., training data 30) is critical (i.e., needs to be protected so as to only be exposed to model training application 28) and output (i.e., model 32) is not critical (i.e., can be exposed). While embodiments herein describe processor 150 executing model training application 28 so as to use training data 30 for training model 32, executing (i.e., by processor 150 in protected environment 22) any batch software application that analyzes dataset 30 is considered to be within the spirit and scope of the present invention.

In the configuration shown in FIG. 6, an application identifier (ID) 157 is associated with model training application 28 (or any software application stored in memory 152. Examples of application ID 157 include, but are not limited to an application name, a file name of an executable file (not shown) for model training application stored on boot volume 64D (or any other storage device 52), a signature for the executable file for the model training application, and a hash value signature for the executable file for the model training application.

In protection embodiments, memory 152 may comprise a list 158 of valid commands 159. Examples of valid commands 159 include application IDs and CLI commands 28 (e.g., install, remove, run and expose_volume). In some embodiments, upon receiving commands 78 from user 106, security module 50 can dynamically update (i.e., add/modify/delete) valid commands 159 in list 158.

In one protection embodiment, upon processor 150 receiving a given command 78 comprising a request to execute a given software application comprising a given application ID 157, security module 50 (or 50B) can check if the received application ID matches any valid command 159 in list 158. If security module 50 detects a match between application ID 157 and any valid command 159 in list 158, then the security module allows processor 150 to start executing the requested software application (e.g., model training application 28). However, if security module 50 does not detect a match, then the security module prevent processor 150 from executing the requested software application.

In another protection embodiment, upon processor 150 receiving a given command 78 comprising a given CLI command or a given call to API 76, security module 50 can check if the received command matches any valid ID 159 in list 158. Security module 50 forwards the received command to server control application 73 only upon detecting a match between the received command and any valid command 159 in list 158.

In the first configuration embodiment, security module 50 (executing on processor 130) forwards commands 78 to AI controller 26 using embodiments described in the description referencing FIG. 1 hereinabove. In the second configuration embodiment described in the description referencing FIG. 2 hereinabove, memory 154 also comprises security module 50B (i.e., as shown in FIG. 6).

In operation, processor 150 boots AI controller 26 by loading operating system 118 from boot volume 64D and executing the operating system. In some embodiments, deep learning inference model 32 can be generated by:

Storage controller 24 generating snapshot 64C (i.e., of data volume 64B).
Processor 150 initiates execution of model training application 28 upon loading the model training application from boot volume 64D.
Model training application 28 analyzes data 30 on snapshot 64B so as to train classification model 32.
Model training application 28 stores the trained deep learning inference model to results volume 64A.

In some embodiments, while training deep learning inference model 32, model training application 28 can intermittently store, to results volume 64A, interim results 154. Interim results 154 may comprise a status of deep learning inference model 32 as it is being trained by model training application 28.

In additional embodiments, storage controller 24 (i.e., processor 130) can set volume access permissions 156 for volumes 64. For example, storage controller 24 can set permissions 156 for a given volume 64 to read/write or read/only.

Volumes 64 managed by storage controller 24 may comprise either block-level volumes 64 and/or Network Attached Storage (NAS) volumes 64. To manage block-level volumes 64, processor 130 can use storage area network (SAN) protocols (i.e., over storage networks 40 and 46) such as Fibre Channel Protocol (FCP), Small Computer System Interface (SCSI), Internet SCSI (iSCSI) or Non-Volatile Memory Express (NVMe). To manage NAS volumes 64, processor 130 can use NAS protocols such as Network File System (NFS) or Common Internet File System (CIFS).

The configuration of AI controller 26 presented in FIG. 6 is configured to operate with the first configuration embodiment of protected facility 22 described in the description referencing FIG. 1 hereinabove. In an alternative configuration, protected facility 22 does not comprise internal LAN 46, and SA 72 and NIC 70 are both directly coupled respectively to networks 40 and 30 (as opposed to being coupled to networks 40 and 30 via storage controller 24). This alternative configuration of AI controller 26 can work with the second configuration embodiment of protected facilities 22 described in the description referencing FIG. 2 hereinabove.

Processors 90, 110, 130 and 150 comprise general-purpose central processing units (CPU) or special-purpose embedded processors, which are programmed in software or firmware to carry out the functions described herein. This software may be downloaded to client workstation(s) 34, trusted server 36, storage controller 24 and AI controller 26 in electronic form, over LANs 38 and/or 46, for example. Additionally or alternatively, the software may be stored on tangible, non-transitory computer-readable media, such as optical, magnetic, or electronic memory media. Further additionally or alternatively, at least some of the functions of these processors may be carried out by hard-wired or programmable digital logic circuits.

In some embodiments, processor 90 may comprise one or more graphics processing units (GPUs).

Examples of memories 92, 132 and 152 include dynamic random-access memories and non-volatile random-access memories. In some embodiments, memories 92, 132, 152 and storage devices 52, 116 may include non-volatile storage devices such as hard disk drives and solid-state disk drives.

In some embodiments, the functionality of AI controller 26 may be deployed in environments such as a data cloud and/or one or more virtual machines (VMs) in one or more computing facilities such as computing site 20. In these environments:

Any allocated server (i.e., VM or cloud server instance) is configured with no external ports other than LAN and SN ports.

Any allocated server is preloaded with the security module

The configuration of any given allocated server can be changed only after detaching from given allocated server from storage and removing model training application 28 from the given allocated server.

Deep Learning Inference Model Training

Figure 7:
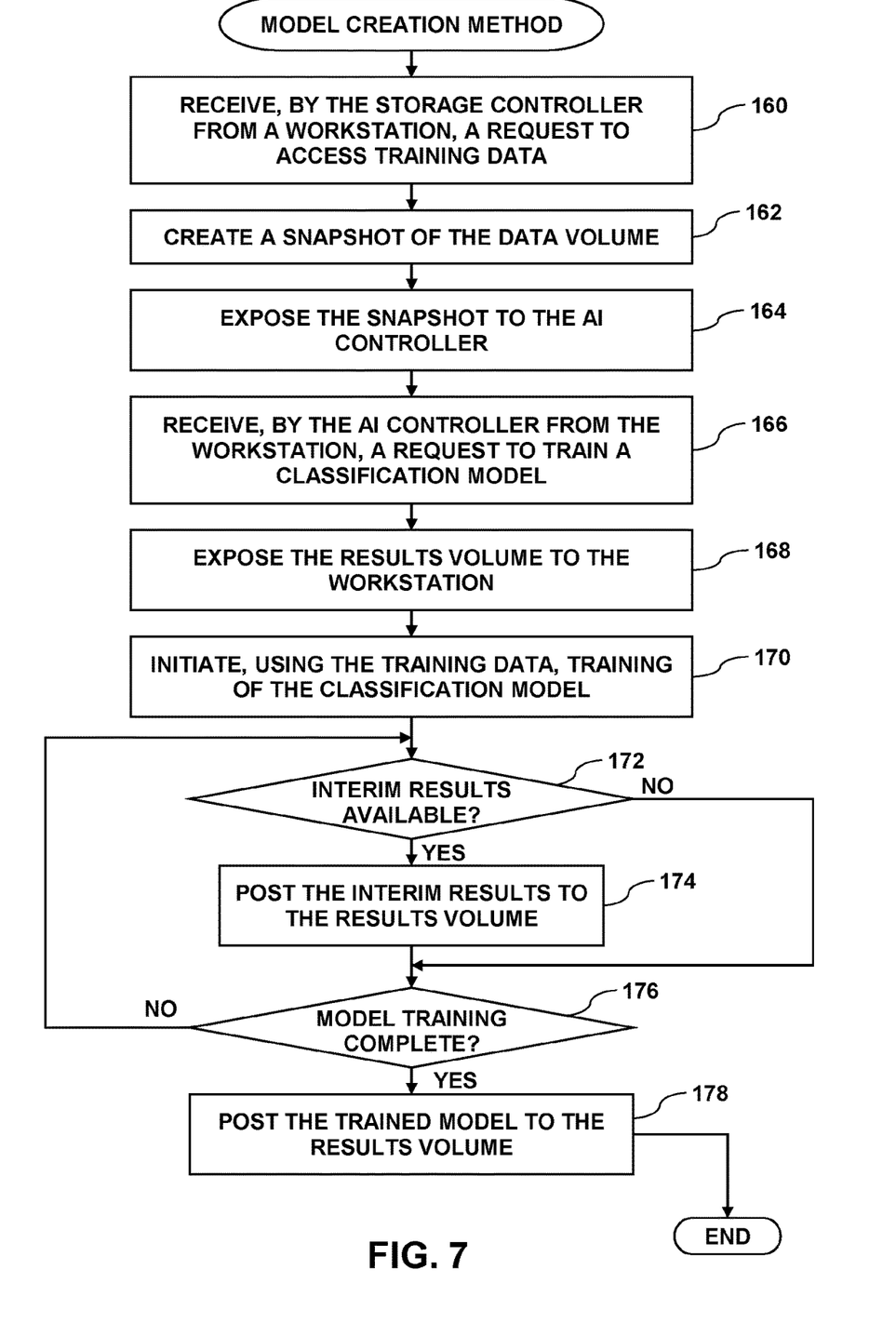
FIG. 7 is a flow diagram that schematically illustrates a method of using the protected facility to train a deep learning inference model, in accordance with an embodiment of the present invention.

FIG. 7 is a flow diagram that schematically illustrates a method of using AI controller 26 in protected facility 22 to train deep learning inference model 32, in accordance with an embodiment of the present invention. Prior to executing the steps described hereinbelow, storage controller 24 defines data volume 64B, and stores training data 30 to the data volume. In some embodiments, processor 150 (i.e., AI controller 26) can be configured to prevent exposing training data 30 to any computing device (e.g., AI controller 26, workstation 34, trusted server 36 or any server on Internet 44) external to protected facility 20.

In step 160, storage application 62 executing on processor 130 in storage controller 24 receives, from a given workstation 34, a request (i.e., a first given command 78) to access training data 30 stored on data volume 64B. In some embodiments, storage application 62 exposes snapshot volume 64C to AI controller 26 in response to receiving expose_volume command 78 from the given workstation. As described supra, storage controller 24 can receive the request either directly from LAN 38 (the second configuration embodiment described in FIG. 2) or from security module 50 (the first configuration embodiment described in FIG. 2). In some embodiments of the present invention, storage application 62 can be configured to expose snapshot volume 64C solely to AI controller 26 (i.e., and not expose the snapshot volume to any other computing device).

In response to receiving the request, storage application 62 defines, in step 162, snapshot volume 64C (also referred to herein as a first volume 64) comprising a snapshot of data volume 64B. Upon storage application 62 generating the snapshot, snapshot volume 64C comprises a copy of training data 30.

In step 164, storage application 62 exposes snapshot volume 64C to AI controller 26. To expose snapshot volume 64C to AI controller 26, storage application 62 grants access (typically read/write permissions 156) to the AI controller. When training deep learning inference model 32, only data 30 stored on snapshot volume 64C is exposed to AI controller 36, thereby protecting the training data on data volume 64B. In some embodiments, storage application can perform step 164 by conveying, to AI controller 26, the CLI commands rescan and mount, so as to direct the AI controller to discover the newly exposed volume, and to mount the newly exposed volume as a file system.

In step 166, model training application 28 executing on processor 150 receives a request (i.e., a second given command 78) to train deep learning inference model 32. In embodiments describe herein, processor 150 can be configured to receive commands 78 only from security module 50 in response to the commands conveyed by workstation(s) 34.

In step 168, storage application 62 exposes results volume 64A (also referred to herein as a second volume) to the given workstation and to AI controller 26. In some embodiments, storage controller 24 can expose results volume 64A to AI controller 26 using the expose_volume, rescan and mount commands 78 described supra. Storage application 62 can expose results volume 64A to AI controller 26 by granting the AI controller read/write permissions to the results volume.

Storage controller 24 can expose results volume 64A to the given workstation in response to first receiving the expose_volume command 78 from the given workstation, and then issuing of rescan and mount commands on the workstation. In some embodiments, the given workstation can convey these commands to storage controller 24 in response to user 106 entering the commands via keyboard 102. Storage application 62 can expose results volume 64A to the given workstation by granting the given workstation read-only or read/write permissions to the results volume.

As described supra, volumes 64B and 64C comprise respective sets of storage blocks 134 on one or more storage devices 52.

In step 170, in response to the received request (step 166), model training application 28 starts training deep learning inference model 32 by analyzing data 30 stored on snapshot volume 64C. In some embodiments, training deep learning inference model 32 may comprising calculating a respective set of weights (not shown) for a set of features (not shown) that model training application 28 extracts from training data 30. In some embodiments, the received request may comprise a request to execute model training application 28.

In step 172, while training a deep learning inference model 32, if model training application 28 generates any interim results 154, then in step 174, the model training application stores the interim results to results volume 64A. In some embodiments, workstation control application 98 executing on processor 90 can retrieve interim results 154 from results volume 64A, and present the interim results on status screen 108.

In step 176, if model training application 28 completes training deep learning inference model 32, then in step 178, the model training application stores the trained deep learning inference model to results volume 64A, and the method ends.

Returning to step 176, if model training application 28 has not completed training deep learning inference model 32, then the method continues with step 172.

Returning to step 172, if model training application 28 did not generate any interim results 154, then the method continues with step 176.

In some instances, it may be required/recommended to upgrade operating system 118 or model training application 28 from a given image 120 stored on trusted server 36. To perform the upgrade:

Trusted server 36 disconnects NIC 112 from external LAN 38

Trusted server 36 conveys the CLI command expose_volume to storage controller 24. In response to receiving the expose_volume command 78, storage controller 24 grants, to trusted server 36, read/write access to (i.e., expose) boot volume 64D.

Trusted server 36 conveys the CLI command remove so as to direct storage controller 24 to remove the current version of operating system 118 or model training application 28 from boot volume 64D.

Trusted server 36 conveys the CLI command install so as to direct storage controller 24 to copy the given image to boot volume 64D.

Upon completion of the upgrade, storage controller 24 can cancel the trusted server's access to the boot volume.

While embodiments described hereinabove describe AI controller 26 executing model training application 28 so as to train model 32 on training data 30, using these embodiments to perform any type of data analysis where input is critical is considered to be within the spirit and scope of the present invention. For example:

In steps 166-170, AI controller 26 may receive a request to perform an analysis on data 30 by receiving a given request 78 to execute a data analysis application (not shown). In other words, the request to train deep learning inference model 32 comprises a request to perform data analysis, and training the deep learning inference model comprises analyzing the data so as to generate results (not shown).

In steps 172 and 174, AI controller 26 store the trained model by storing the (interim and the final) results of the analysis to results volume 64A.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. An apparatus, comprising:
an internal network within a protected facility;
a security module within the protected facility unidirectionally coupling the internal network to a workstation external to the protected facility, and configured to carry commands in one direction from the workstation to the internal network and to be incapable of carrying commands in the opposite direction from the internal network to the workstation;
a storage controller coupled to a storage network and the internal network, and configured:
to define first and second volumes comprising respective sets of storage blocks on one or more storage devices,
to store a dataset to the first volume, and
to expose the second volume to the workstation via the storage network; and
a processor within the protected facility, coupled to the internal network and configured to receive the commands only from the security module in response to the commands conveyed by the workstation via the security module, and is further configured:
to receive, from the storage controller, access to the dataset,
to receive, from the workstation via the security module, a given command comprising a request to train a deep learning inference model,
to analyze, in response to the request, the dataset so as to train the deep learning inference model, and
to store, via the storage network, the trained deep learning inference model to the second volume.

2. The apparatus according to claim 1, wherein the processor is further configured to prevent exposing the dataset to any computing device external to the protected facility, wherein a given computing device comprises the workstation.

3. The apparatus according to claim 1, wherein the processor is configured to receive access to the dataset in response to generating, by the storage processor, a snapshot volume comprising a copy of the dataset, and exposing, by the storage processor, the snapshot volume solely to the processor, and wherein the processor is configured to analyze the dataset by analyzing the copy of the dataset on the snapshot volume.

4. The apparatus according to claim 1, wherein the storage controller is configured to expose the second volume to the workstation by setting permissions of the second volume to the workstation as read-only.

5. The apparatus according to claim 1, wherein the security module is configured to carry commands in one direction by forwarding only the commands found in a dynamically updated set of commands.

6. The apparatus according to claim 1, wherein a given command comprises an identity of a software application.

7. The apparatus according to claim 6, wherein the software application comprises a model training application, and wherein the processor is configured to train the deep learning inference model by executing a model training application.

8. The apparatus according to claim 7, wherein the model training application is configured to execute in batch mode.

9. The apparatus according to claim 1, wherein the processor is configured to analyze the dataset by executing a batch application.

10. The apparatus according to claim 1, wherein a given command comprises an application programming interface (API) call.

11. The apparatus according to claim 1, wherein a given command comprises a command line interface (CLI) command.

12. The apparatus according to claim 1, wherein the processor is further configured to generate interim results while training the deep learning inference model, and to store the interim results to the second volume.

13. The apparatus according to claim 1, wherein the security module is further configured to carry responses in the opposite direction from the internal network to the workstation.

14. The apparatus according to claim 1, wherein the deep learning inference model comprises a classifier.

15. The apparatus according to claim 1, wherein the protected facility is further configured to enclose the storage controller.

16. The apparatus according to claim 1, wherein the processor comprises one or more graphics processing units (GPUs).

17. The apparatus according to claim 1, wherein the storage network comprises a storage area network (SAN).

18. The apparatus according to claim 1, wherein the storage network comprises network attaches storage (NAS).

19. The method according to claim 1, wherein the request to train a deep learning inference model comprises a request to perform data analysis, wherein the processor can train the deep learning inference model by analyzing the data so as to generate results and wherein the processor can store the trained deep learning inference model by storing the results of the analysis.

20. A method, comprising:
providing an internal network within a protected facility;
providing a security module within the protected facility unidirectionally coupling the internal network to a workstation external to the protected facility, and configured to carry commands in one direction from the workstation to the internal network and to be incapable of carrying commands in the opposite direction from the internal network to the workstation;
providing a storage controller coupled to a storage network and the internal network, and configured:
    to define first and second volumes comprising respective sets of storage blocks on one or more storage devices,
    to store a dataset to the first volume, and
    to expose the second volume to the workstation via the storage network; and
providing a processor within the protected facility, coupled to the internal network and configured to receive the commands only from the security module in response to the commands conveyed by the workstation via the security module, and is further configured:
    to receive, from the storage controller, access to the dataset,
    to receive, from the workstation via the security module, a given command comprising a request to train a deep learning inference model,
    to analyze, in response to the request, the dataset so as to train the deep learning inference model, and
    to store, via the storage network, the analysis results to the second volume.

\* \* \* \* \*